United States Patent
Hesse et al.

(10) Patent No.: US 6,460,096 B1
(45) Date of Patent: Oct. 1, 2002

(54) AUTOMATIC SERIAL BUS TRANSMISSION SEQUENCER

(75) Inventors: Michael D. Hesse, Dearborn Heights; Alan R. Ward, Troy, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/382,334

(22) Filed: Aug. 25, 1999

(51) Int. Cl.⁷ .............................................. G06F 13/14
(52) U.S. Cl. ............................ 710/56; 710/3; 710/107; 710/126; 709/207
(58) Field of Search ............................. 710/3, 56, 107, 710/126; 709/207

(56) References Cited

U.S. PATENT DOCUMENTS

| | | | |
|---|---|---|---|
| 4,435,762 A | * | 3/1984 | Milligan et al. ............... 710/6 |
| 4,800,524 A | * | 1/1989 | Roesgen |
| 5,418,526 A | | 5/1995 | Crawford |
| 5,418,720 A | | 5/1995 | Randel |
| 5,579,299 A | | 11/1996 | Halter et al. |
| 5,666,551 A | * | 9/1997 | Fenwick et al. ............ 709/207 |
| 5,748,675 A | | 5/1998 | Hormel et al. |
| 5,768,625 A | * | 6/1998 | Muramatsu et al. .......... 710/56 |
| 6,178,466 B1 | * | 1/2001 | Gilbertson et al. ............ 710/3 |

* cited by examiner

Primary Examiner—Jeffrey Gaffin
Assistant Examiner—Abdelmoniem Elamin
(74) Attorney, Agent, or Firm—Edwin W. Bacon, Jr.

(57) ABSTRACT

A messaging system for a vehicle is disclosed. The messaging system includes a primary controller for transmitting and receiving information. The primary controller generates an array of data messages. A communication module is connected to the primary controller for receiving and storing the array of data messages in a memory. The communication module includes a sequencing controller for sequencing through the array of data messages and selecting individual data messages for transmission by the communication module. A data bus is connected to the communication module and provides a communication link between at least one additional vehicle node connected to the data bus.

17 Claims, 3 Drawing Sheets

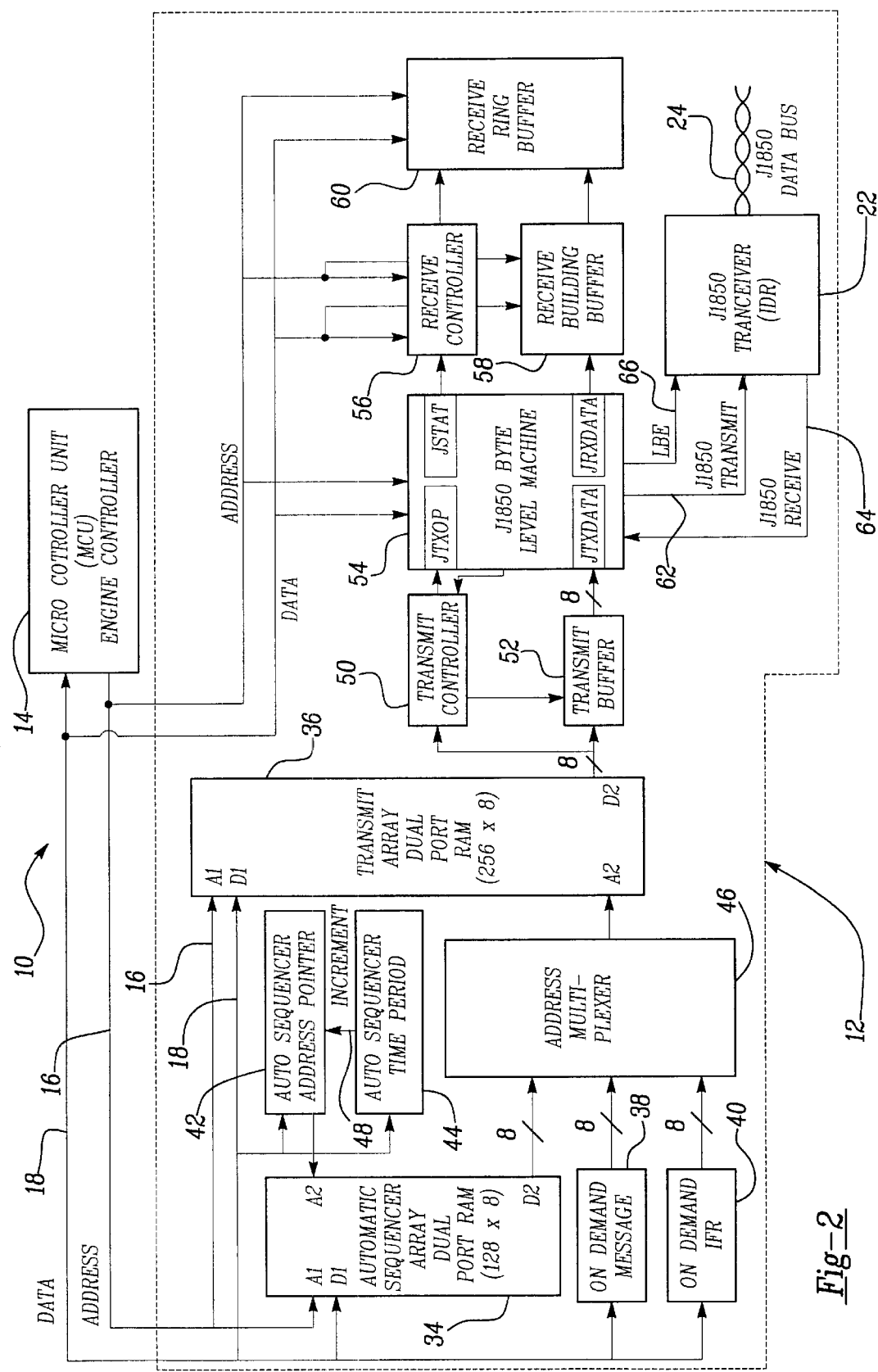

AUTOMATIC SERIAL BUS TRANSMISSION SEQUENCER

BACKGROUND OF THE INVENTION

1. Technical Field

The present invention generally relates to a communication module for a vehicle data communication system. More particularly, the present invention is directed to an I/O module which is disposed between a primary vehicle controller and a communication network, such as an SAE J1850 serial communication data bus or other suitable communication network, for alleviating the I/O processing burden of the primary vehicle controller.

2. Discussion

Automotive vehicles are commonly equipped with multiple-access serial data communications networks to enable data transfer between various electronic components within the vehicle. The Society of Automotive Engineers (SAE) has established the J1850 class data communications network which has become widely accepted throughout the automotive industry. The J1850 protocol is a set of technical requirements and parameters which specify the use of symbols for communicating serial data over a one or two-wire communications bus.

The J1850 protocol is based on a medium-speed (Class B) serial multiplex communication protocol specifically intended for use in automotive vehicles. Serial multiplex communication (MUX) is a method of reducing wiring requirements while increasing the amount and type of data which may be shared between various electronic components connected to the communication network. This technique is achieved by connecting each component, or node, to a serial bus, consisting of either a single wire or a twisted pair of wires. Each node collects whatever data is useful to itself or other nodes (i.e. wheel speed, engine rpm, oil pressure, etc.), and then transmits this data onto the J1850 bus, where any other node which needs this data can receive it. This data sharing technique reduces wiring and eliminates the need for redundant sensing systems.

In one exemplary implementation, two or more microprocessor based controllers are positioned throughout the vehicle and communicate with each other along the J1850 data bus. Each controller will periodically transmit information in the form of message data organized into a single message frame. This transmission can take place after the controller determines that the data bus is free. Once this message frame is transmitted onto the J1850 bus, this information is available to either a specific node, such as another controller, or all of the nodes on the data bus depending on the type of messaging scheme implemented.

An additional feature of the J1850 protocol allows one or more of the nodes to respond to the original data message within the same message frame (i.e. within a short period of time after receiving the original message, but before another node begins transmitting a new message frame). Within the J1850 protocol, this is referred to as an "in-frame response" (IFR). Accordingly, the J1850 protocol design provides a single wire network through which information can be exchanged between various controllers connected to the data bus. For example, the engine controller and the transmission controller may exchange information via the J1850 data bus concerning real-time operating or performance conditions of their associated systems. However, monitoring the data bus places an additional burden on the controller, Therefore, it is desirable to provide a communication module for improving the performance of the primary controller in a vehicle data communication system by reducing the processing burden placed on the controller for transmitting and processing non-critical data messages. It is further desirable to provide a communication module that can be pre-programmed with an initial set of communication tasks, and sequence through the set of tasks for minimizing interaction between the primary controller and the communication module.

SUMMARY OF THE INVENTION

The present invention is directed to a messaging system for a vehicle. The messaging system includes a primary controller for transmitting and receiving information. The primary controller generates an array of data messages. A communication module is connected to the primary controller for receiving and storing the array of data messages in a memory. The communication module includes a sequencing controller for sequencing through the memory and selecting individual data messages from the array of data messages. A data bus is connected to the communication module and provides a communication link between at least one additional vehicle node connected to the data bus.

BRIEF DESCRIPTION OF THE DRAWINGS

Additional objects, advantages and features of the present invention will become apparent from the following description and appended claims, taken in conjunction with the accompanying drawings in which:

FIG. 2 is a schematic diagram of the communication module in accordance with a preferred embodiment of the present invention;

DETAILED DESCRIPTION OF THE PREFERRED EMBODIMENT

Figure 1:
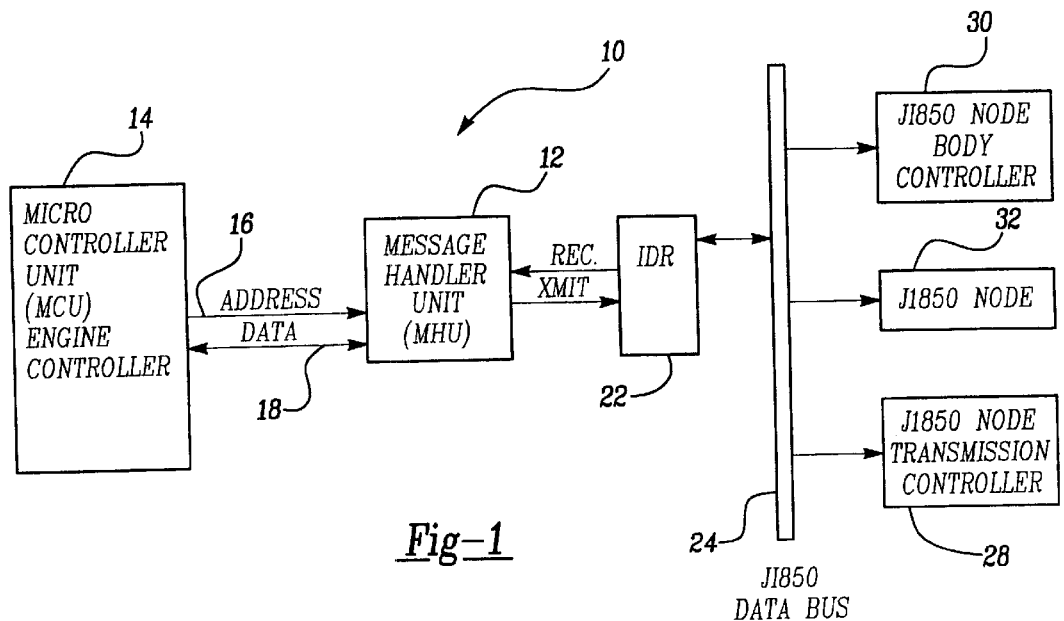
FIG. 1 is a schematic diagram showing the communication system of the present invention.

Referring now to FIG. 1, the vehicle communication system 10 which utilizes the communication module or message handler unit 12 of the present invention is shown. A primary vehicle controller, such as an engine controller 14 is connected to the communication module 12 via a plurality of address lines 16 and a plurality of bidirectional data lines 18. The communication module 12 is connected to an integrated driver receiver (IDR) chip 22 via receive and transmit lines. The IDR chip 22 is then connected to a J1850 serial data bus 24 as is known within the art. The IDR chip 22 is a commercially available integrated circuit which functions to convert the voltage levels between the data bus 24 and its host device, namely communication module 12. Also shown is that a plurality of J1850 compatible devices, such as a transmission controller 28, a body controller 30, and a generic J1850 node 32 are also connected to the J1850 data bus 24.

Turning now to FIG. 2, the components forming the communication module 12 are shown. The purpose of the communication module or message handler unit 12 is to remove the burden of processing (transmitting and receiving) non-real time messages and non-critical messages from the engine controller 14. Generally, the communication module 12 is programmed by the engine controller 14 at start-up with a sequence of operation codes and corresponding data which make up the messages that can be transmitted onto the data bus 24. The details associated with these messages will be described in greater detail below.

As shown, the engine controller 14 can address the hardware of the communication module 12 via address lines 16. The engine controller 14 can also transmit and receive data to/from the communication module 12 via bidirectional data lines 18. The address lines 16 are connected to an automatic sequencer array memory 34, and to a transmit array memory 36. Preferably, the automatic sequencer array memory 34 is a dual port RAM having 128×8 memory locations, and the transmit array memory 36 is also a dual port RAM having 256×8 memory locations.

The data lines 18 are also connected to the automatic sequencer array memory 34 and the transmit array memory 36. In addition, the data lines 18 are connected to an on demand message module 38, an on demand in frame response (IFR) module 40, an auto sequencer address pointer module 42, and an auto sequencer time period module 44. The operation of these four modules is described in greater detail below. The data output lines from the automatic sequencer array memory 34, the on demand message module 38, and the on demand IFR module 40 are all connected to separate inputs of an address multiplexer 46 which performs the necessary address decoding to the A2 address input of the transmit array memory 36.

With continued reference to FIG. 2, the D2 output of the transmit array memory 36 is connected to a transmit controller 50, and also to a transmit buffer 52. The transmit controller 50 is responsible for fetching opcodes 78 from the transmit array memory 36 and interfacing with a J1850 byte level machine 54 to transmit the desired message data 80. The transmit buffer 52 receives the J1850 message data 80 that is to be transmitted.

Figure 3:
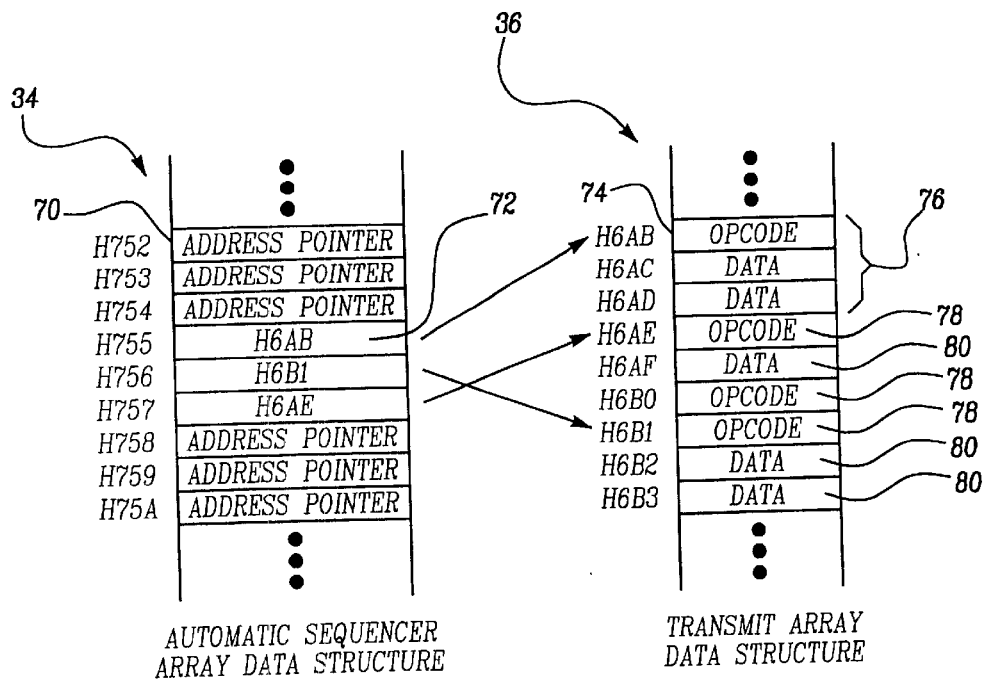
FIG. 3 is a diagram showing the automatic sequencer array data structure utilized by the communication module of the present invention.

Referring briefly to FIG. 3, the data structure of the automatic sequencer array memory 34 is shown. The array memory 34 preferably includes 128 memory registers 70 for storing a sequence of address pointers 72 used for controlling the J1850 transmit operations. The registers 70 within the memory 34 are written to by the engine controller 14 (at start-up) with the sequence of address pointers 72 which point to message packets 76 in the transmit array memory 36. The registers 70 within the automatic sequencer array memory 34 are sequenced in consecutive order according to a predetermined clock rate. When a particular memory register 70 is selected, the address pointer 72 stored within the memory register 70 is transmitted on the D2 output to the address multiplexer 46 (FIG. 2). As part of the data structure of the sequencer array memory 34, if the address pointer value H00 is stored within one of the registers 70, this represents a "no operation" condition in which no message is transmitted from the communication module 12.

With continued reference to FIG. 3, the data structure of the transmit array memory 36 is shown. The transmit array memory 36 also preferably includes, 256 memory registers 74 for storing the set of message packets 76 available for transmission onto the J1850 data bus 24. Each register 74 has a unique address. The registers 74 within the transmit array memory 36 are also written to by the engine controller 14 (both at start-up and during operation) with the message packets 76. Each message packet 76 is made up of a one-byte opcode 78, and is optionally followed by various message data bytes 80. The opcode 78 describes the message packet type, and the total number of bytes of information for transmission onto the J1850 data bus. The message data byte or bytes 80 contain the actual message information which is to be transmitted. When two or more message data bytes 80 follow an opcode 78, the message data bytes 80 for that message packet 76 are transmitted in sequential order.

As part of the present invention, it is preferred that the layout of the data stored within the transmit array memory 36 is standardized so that each message packet 76 has a predetermined data location 80. The software or firmware algorithm running within the engine controller 14 can then program the order in which the message packets 76 are to be transmitted. This order is programmed by the engine controller 14 when the algorithm generates and stores the sequence of address pointers 72. As engine related information is processed by the engine controller 14 during vehicle operation, specific pieces of information are written to their predetermined data location 80 within the transmit array memory 36. Additionally, the engine controller 14 can also modify the order in which the message packets 76 are to be transmitted during operation of the communication module 12.

For example, once every N system clock cycles, engine speed in RPMs may be written to memory location H6AF, oil pressure may be written to memory location H6B2, and engine temperature may be written to memory location H6B3; all within the transmit array memory 36. It should be understood that N may be different for each piece of information.

FIG. 3 also shows an exemplary address pointer sequence. More specifically, register H755 of the sequencer array memory 34 is shown storing the address pointer H6AB, which points to the opcode 78 stored in register H6AB of the transmit array memory 36. Register H756 points to the opcode 78 stored in register H6B1, and register H757 points to the opcode 78 stored in register H6AE. Accordingly, one skilled in the art will appreciate that the address pointer scheme of the present invention allows the message packets 76 stored within the transmit array memory 36 to be transmitted in any order.

Figure 4:
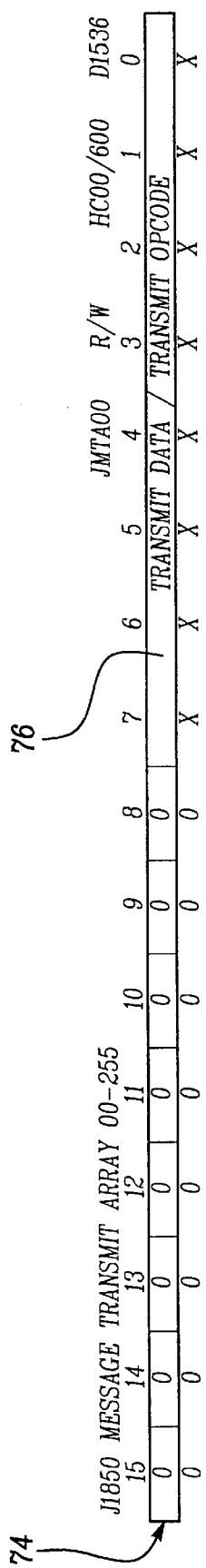
FIG. 4 is a diagram showing the bit level data structure of the message transmit array.

With reference to FIG. 4, the data layout for each register 74 within the transmit data array 36 is shown. As described above, each register 74 stores either a one-byte opcode 78 or one-byte of message data 80. In the preferred implementation, bits fifteen (15) through eight (8) are unused, and bits seven (7) through zero (0) are used for representing the message packets 76. However, one skilled in the art will appreciate that all sixteen bits of each register 74 may be used for representing the message packets 76.

Figure 5:
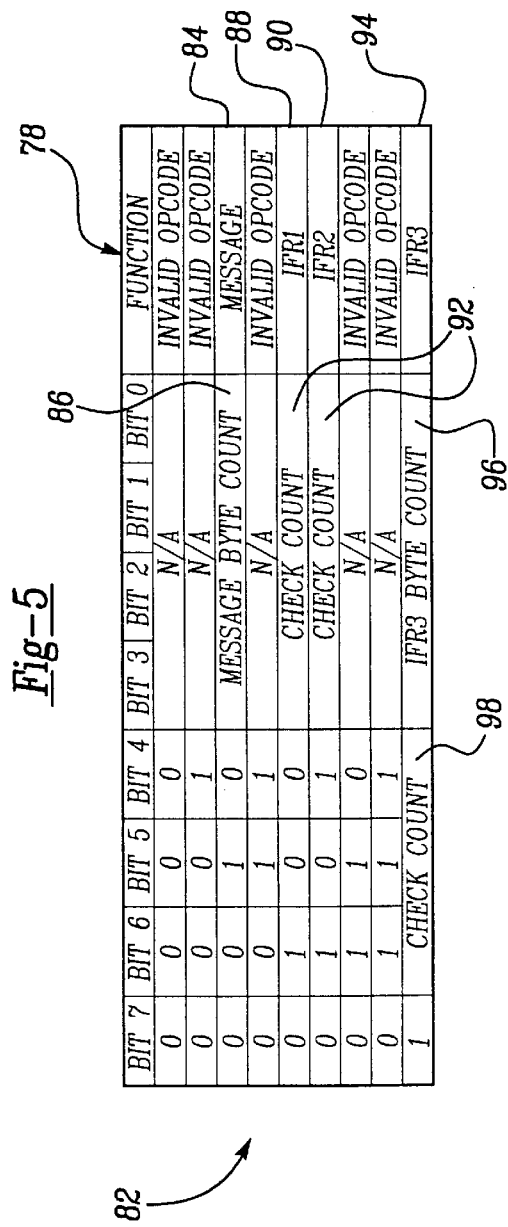
FIG. 5 is a diagram showing the bit level data structure of the various operational codes which can be stored within the transmit array data structure.

Turning now to FIG. 5, table 82 discloses the preferred encodings for the opcodes 78 associated with the present invention. Table 82 shows encoding definitions for four valid opcode types, and five invalid opcodes. The message opcode 84 is used for standard messages packets. The message byte count field 86 contains the number of data bytes 80 following the opcode to be transmitted. The IFR1 opcode 88 is for type 1 in-frame response messages, and the IFR2 opcode 90 is for type 2 in-frame response messages. The check count fields 92 each contain a value used for checking the number of bytes in the message portion of the response frame before transmitting the in-frame response. Finally, the IFR3 opcode 94 is for type 3 in-frame response messages. The IFR3 byte count field 96 contains the number of data bytes 80 following the opcode to be transmitted. The check count field 98 also contains a value used for checking the number of bytes in the message portion of the response frame before transmitting the in-frame response.

Referring back to FIG. 2, the operation of the communication module 12 is described. The sequencing of the automatic sequencer array memory 34 is controlled by the auto sequencer address pointer module 42 and the auto sequencer time period module 44. The auto sequencer address pointer module 42 is preferably a programmable register for storing an address pointer which points to a memory register 70 in the sequencer array memory 34. As described above, the memory register 70 contains an address within the transmit array memory 36 of the current message packet 76 to be transmitted. Upon reset, the address pointer within the address pointer module 42 is initialized to zero. After a predetermined interval, the address pointer is incremented, and an address 72 pointing into the transmit array memory 36 is fetched from the automatic sequencer array memory 34. Thus, transmissions from the communication module 12 begin from the first memory register 70 after a reset condition. Additionally, a read from the auto sequencer address pointer module 42 provides an indication of the current address pointer 72 as opposed to the next pointer within the sequencer array memory 34.

The auto sequencer time period module 44 controls the time intervals for incrementing the address pointer used by the automatic sequencer address pointer module 42. The next address pointer is sequenced through increment line 48. When the address pointer reaches the last memory register 70 in the sequencer array memory 34, the pointer wraps around and continues sequencing at the top of the sequencer array memory 34. The preferred time interval is expressed in system clock cycles divided by a clock prescaler, such as 4096, that provides a timebase interval measured in milliseconds. By programming a value into the time period module 44, the time between message transmissions can be set and/or adjusted. The register in the time period module 44 is initialized at reset with all zeros which effectively disables the communication module 12. A non-zero value must be programmed by the engine controller 14 into the time period module 44 before the communication module 12 will begin transmitting messages.

For transmission of all messages by the communication module 12, the data which is to be transmitted from the J1850 byte level machine 54 is stored in the transmit array memory registers 74. The engine controller 14 programs these registers via data lines 18 with message packets 76. As will be appreciated from the following description, the communication module 12 of the present invention has three separate methods of transmitting the message packets 76 stored within the transmit array memory 36, namely, automatic sequencer data transmission, on demand message data transmission, and on demand IFR data transmission.

For automatic sequencer data transmission, the automatic sequencer memory registers 70 are programmed by the engine controller 14 with addresses which point into the transmit array memory 36. Addresses fetched from the sequencer registers 70 are ultimately passed to the transmit controller 50 at the rate set by the auto sequencer time period module 44. The transmit controller 50 then fetches the opcode 78 from the transmit array memory 36. The appropriate number of message data bytes 80 are then moved from the transmit array memory 36 to the transmit buffer 52 eleven (11) bytes at a time at a rate of one data byte per clock cycle. Data transfers, therefore, take eleven (11) clock cycles. If at any time during the transfer, the engine controller 14 writes to the transmit array memory 36, the data transfer is aborted.

Upon completion of the engine controller write cycle, the transmit controller 50 once again attempts to move the message data bytes 80 from the transmit array memory 36 to the transmit buffer 52. As a result, data coherency of the message data 80 within a message packet 76 is maintained. Once all of the message data bytes 80 have been successfully transferred to the transmit buffer 52, the transmit controller 50 writes the message data bytes 80 to the J1850 byte level machine 54 for transmission onto the J1850 data bus 24. As shown, the byte level machine 54 is connected to address lines 16 and data lines 18. The J1850 byte level machine 54 is responsible for bus arbitration and the successful transmission of the message data 80. The J1850 byte level machine 54 sends the message information along transmit line 62 to the IDR chip 22 for transmission onto the data bus 24.

If bus arbitration is lost any time during transmission of the frame, transmission is immediately halted until the next idle bus. The transmit controller 50 automatically attempts to re-transmit the data and starts by moving the message data bytes 80 from the transmit array memory 36 to the transmit buffer 52. This technique insures that the most up to date data is transmitted. As part of the present system, the number of retransmit attempts is programmable.

The on demand message module 38 is used for messages that need to be transmitted onto the data bus 24 immediately (on demand) by the communication module 12. In operation, a register within the on demand message module 38 is written to by the engine controller 14 via data lines 18 with an address which points into the transmit array memory 36. At the next available opportunity, the transmit controller 50 fetches the opcode 78 from the transmit array memory 36. The transmit buffer 52 then receives the message data bytes 80 associated with that opcode 78. The transmit controller 50 then moves this information to the J1850 byte level machine 54 for transmission onto the data bus 24 as described above. Thus, on demand messages are given priority over automatic sequencer data transmissions.

The J1850 byte level machine 54 can also receive data via receive line 64 from the J1850 data bus 24. Data received from the bus 24 is placed into a receive building buffer 58. The receive controller 56 is then notified of this incoming data by the J1850 byte level machine 54. The incoming data stored in the receive building buffer 58 is then transferred to a receive ring buffer 60 having a plurality of memory registers organized in a sequential ring structure. As shown, the receive controller 56, the receive building buffer 58 and the receive ring buffer 60 are all connected to the engine controller 14 via address lines 16 and data lines 18. The sequencing of the ring buffer 60 is controlled by the receive controller 56. The ring buffer 60 can be directly addressed by the engine controller microprocessor 14 via address lines 16. According to this technique, the engine controller can receive data from the data bus 24 which is addressed to the communication module 12.

As will be appreciated, the engine controller 14 can therefore monitor incoming J1850 messages received from the data bus 24 via IDR chip 22 through the receive ring buffer 60. The engine controller 14 is also capable of acknowledging these J1850 messages by sending an in frame response (IFR). An IFR is generally defined as one J1850 node responding to another J1850 node within the same J1850 message frame. The on demand IFR module 40 controls the transmission of in frame response messages. Once the engine controller 14 determines that an in frame response is required, a register within the on demand IFR module 40 is written to with an address pointer into the transmit array memory 36. This pointer points to a transmit array memory register 74 which contains the IFR data to be transmitted onto the J1850 data bus 24. Like the other types of transmissions, the first byte in the array contains the opcode 78.

In summary, the present invention is intended to reduce the interaction between a host microprocessor, such as engine controller 14, and the communication module 12, in order to decrease the number of instructions processed by the microprocessor. The features of the present invention allow the communication module 12 to automatically schedule transmit messages, place receive messages into a ring buffer, transmit on demand messages, and to automatically handle the transmittal and reception of in-frame responses. However, one skilled in the art will readily appreciate that the present invention is not limited to J1850 multiplexed communications, as the teachings of the present invention can be easily adapted by other communication protocols.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A messaging system for vehicle comprising:
   a primary controller for transmitting and receiving information, the primary controller generating an array of data messages;
   a communication module connected to the primary controller, the communication module having a first memory arranged to store the array of data messages at specific memory register locations, the data messages being written to the specific memory register locations by the primary controller;
   a second memory arranged to store an array of address pointers, the array of address pointers being written to the second memory by the primary controller and pointing to the specific memory register locations of the first memory; and
   a sequencing controller arranged to continuously sequence through the array of address pointers and select individual address pointers; and
   a data bus connected to the communication module and providing a communication link between at least one additional vehicle node connected to the data bus, the data bus being arranged to transmit the data messages pointed to by the selected individual address pointers.

2. The messaging system of claim 1 wherein the communication module further includes a sequence time period module for receiving an initialization signal from the primary controller and implementing a sequencing algorithm.

3. The messaging system of claim 2 wherein the sequencing algorithm controls the sequencing controller.

4. The messaging system of claim 1 wherein the sequencing controller sequences through consecutive address pointers in the first memory.

5. The messaging system of claim 4 wherein the sequencing controller sequences through address pointers in the first memory at periodic time intervals.

6. The messaging system of claim 1 wherein the communication module includes an on demand message module for receiving message data from the primary controller and generating on demand messages for transmission onto the data bus.

7. The messaging system of claim 1 wherein the communication module includes an on demand in-frame response (IFR) module for receiving IFR data from the primary controller and generating IFR messages for transmission onto the data bus.

8. The messaging system of claim 1 wherein the communication module receives in-frame response (IFR) messages from the data bus and transfers the IFR messages to the primary controller.

9. The messaging system of claim 1 wherein the array of data messages includes a plurality of message packets having an opcode describing the message packet type, each opcode being optionally followed by one or more message data bytes.

10. The messaging system of claim 9 wherein the message data bytes contain information which is periodically generated and updated by the primary controller.

11. A messaging system for a vehicle comprising:
    a primary controller for transmitting and receiving information;
    an array of data messages generated by the primary controller, the array of data messages being organized into a plurality of message packets;
    an array of address pointers which point to individual message packets within the array of data messages;
    a communication module connected to the primary controller, the communication module including a first memory for receiving and storing the array of data messages and a second memory for receiving and storing the array of address pointers, the communication module further including a sequencing controller for continuously sequencing through the second memory and selecting an address pointer;
    an address multiplexer for receiving the address pointer and addressing the first memory, the first memory transmitting a message packet;
    a transmit controller connected to the first memory for receiving the message packet, the transmission controller transferring the message from the first memory to a transmit buffer; and
    a data bus connected to the transmit controller and providing a communication link between the transmit buffer and at least one additional vehicle node connected to the data bus.

12. The messaging system of claim 11 wherein each message packet includes an opcode describing the message packet type, each opcode being optionally followed by one or more message data bytes.

13. The messaging system of claim 12 wherein the message data bytes contain information which is periodically generated and updated by the primary controller.

14. The messaging system of claim 11 wherein the address pointers are organized into a predetermined sequence by the primary controller.

15. The messaging system of claim 11 wherein the communication module further includes a receive controller connected to the data bus for receiving data messages generated by another node connected to the data bus and routing the data messages to the primary controller.

16. The messaging system of claim 15 wherein the communication module further includes a receive ring buffer for receiving data messages from the receive controller and placing the data messages into a continuous memory ring structure, wherein the data messages stored within the memory ring structure are periodically transferred to the primary controller.

17. A messaging system for a vehicle comprising:

a primary controller for transmitting and receiving information;

an array of data messages generated by the primary controller, the array of data messages being organized into a plurality of message packets, each message packet including an opcode describing the message packet type, each opcode being optionally followed by one or more message data bytes, the message data bytes containing information which is periodically generated and updated by the primary controller;

an array of address pointers which point to individual message packets within the array of data messages, the address pointers being organized into a predetermined sequence by the primary controller;

a communication module connected to the primary controller, the communication module including a first memory for receiving and storing the array of data messages and a second memory for receiving and storing the array of address pointers, the communication module further including a sequencing controller for continuously sequencing through the second memory and selecting an address pointer;

an address multiplexer for receiving the address pointer and addressing the first memory, the first memory transmitting a message packet;

a transmit controller connected to the first memory for receiving the message packet, the transmission controller transferring the message from the first memory to a transmit buffer;

a data bus connected to the transmit controller and providing a communication link between the transmit buffer and at least one additional vehicle node connected to the data bus; and a receive controller connected to the data bus for receiving data messages generated by another node connected to the data bus and routing the data messages to the primary controller.

* * * * *